United States Patent Office 3,281,473
Patented Oct. 25, 1966

3,281,473
METHOD OF PREPARING DIBENZOL SULFIDES
Francis X. O'Shea, Wolcott, Conn., assignor to United States Rubber Company, New York, N.Y., a corporation of New Jersey
No Drawing. Filed Aug. 1, 1963, Ser. No. 299,149
3 Claims. (Cl. 260—609)

This invention relates to a new method of preparing compounds having the general formula:

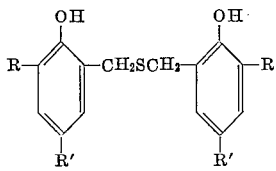

in which R and R' are alkyl, cycloalkyl or aralkyl groups of up to 12 carbon atoms each.

The method of the present invention involves the reaction of two molar equivalents of an intermediate compound having the general formula:

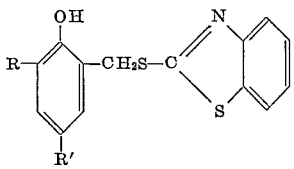

in which R and R' are the same as defined above, with at least one molar equivalent (up to two molar equivalents) of an alkali metal sulfide such as sodium or potassium sulfide.

The intermediate may be prepared by the reaction of a phenol of the general formula:

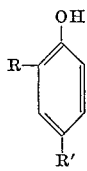

the R and R' being the same as in the above formulae, with formaldehyde and 2-mercaptobenzothiazole under acid catalysis in a reaction similar to that described in Sebrell U.S. Patents 2,134,957 (patented November 1, 1938) and 2,150,463 (patented March 14, 1939).

The prior U.S. patent to L. A. Mikeska and A. R. Kittleson, Patent No. 2,488,134 (patented November 15, 1949) describes the preparation of a mixture of alkylhydroxybenzyl chlorides, called chloromethyl alkyl phenols, by the chloromethylation of alkyl phenols, e.g., p-tert.-octylphenol, and treating the mixture of chloromethyl tert.-octyl phenols in alcohol with potassium sulfide and refluxing to yield a mixture of products considered by the inventor to have chiefly the structure

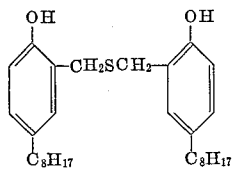

Because chloromethylation of phenols is difficult and tends to produce diarylmethane by-products, the method of the type described by Mikeska and Kittleson tends to give intermediates and products which are extremely difficult to separate and purify. On the other hand, the intermediates of the method of the present invention are readily isolated and react cleanly with the alkali metal sulfide to produce excellent quality products.

The equation for the reaction of the present invention is

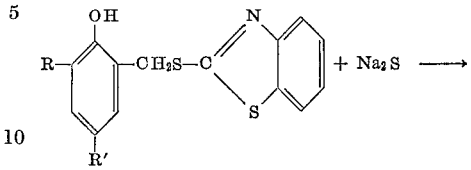

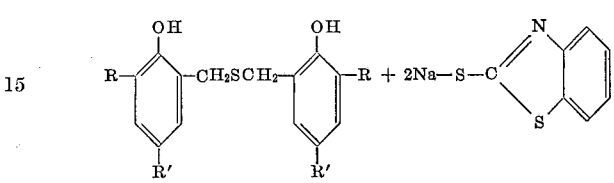

in which R and R' are the same as in the formulae set forth above. The reaction is ordinarily carried out in a liquid medium comprising an organic solvent, e.g. in a water miscible organic solvent such as methanol, ethanol, isopropanol, acetone, dioxane, ethylene glycol, dimethyl ether, etc. at a temperature from about 20° C. to about 100° C. Ordinarily the reaction is carried out at the reflux temperature of the solution. The reaction may also be carried out in a two-phase system such as benzene-water, xylene-water, etc. using good agitation.

Examples of R and R' in the above formulae and reaction are methyl, ethyl, isopropyl, t-butyl, t-octyl, decyl, dodecyl, cycloheptyl, cyclohexyl, cyclooctyl, benzyl, alpha-methyl-benzyl, alpha, alpha-dimethylbenzyl, etc. Examples of 2,4-disubstituted phenols that may be used in preparing the intermediate compounds that are reacted with alkali metal sulfide are 2,4-dimethylphenol,
2-methyl-4-t-butylphenol,
2-t-butyl-4-methylphenol,
2,4-di-t-butylphenol,
2-methyl-4-cyclohexylphenol,
2-cyclohexyl-4-methylphenol,
2,4-dicyclohexylphenol,
2-methyl-4-t-octylphenol,
2-t-octyl-4-methylphenol,
2,4-di-t-octylphenol,
2-nonyl-4-methylphenol,
2-methyl-4-nonylphenol,
2,4-dinonylphenol,
2-methyl-4-(alpha-methylbenzyl)phenol,
2-(alpha-methylbenzyl)-4-methylphenol,
2,4-di(alpha-methylbenzyl)phenol,
2-methyl-4-(alpha,alpha-dimethylbenzyl)phenol,
2-(alpha,alpha-dimethylbenzyl)-4-methylphenol,
2,4-di(alpha,alpha-dimethylbenzyl)phenol, etc.

The following examples illustrate the invention. Percentages referred to herein are by weight.

EXAMPLE 1

*Preparation of bis(2-hydroxy-3-t-butyl-5-methyl-benzyl)sulfide*

The intermediate 2-hydroxy-3-t-butyl-5-methylbenzyl 2-benzothiazolyl sulfide was prepared in the following manner:

2-mercaptobenzothiazole (584.5 g., 3.5 moles) was suspended in one liter of isopropyl alcohol in a 3-liter, 3-neck flask equipped with a mechanical stirrer, condenser, thermometer and addition funnel. To the suspension was added 292 g. (3.6 moles) of 37% aqueous formaldehyde and the mixture was warmed to 60–70° C. for 30 minutes. 2-t-butyl-p-cresol (492 g., 3 moles) was then added followed by 100 ml. of concentrated hydrochloric acid. The mixture was then refluxed for four hours with stirring, the crystalline product beginning to precipitate out after one hour. The mixture was cooled and the product was filtered off, washed with isopropyl alcohol and dried. The yield of 2-hydroxy-3-t-butyl-5-methylbenzyl 2-benzothiazolyl sulfide was 744 g. (yield 72%), M.P. 164–165° C.

A solution of 128.8 g. (0.375 mole) of the 2-hydroxy-3-t-butyl-5-methylbenzyl 2-benzothiazolyl sulfide and 48 g. (0.2 mole) of $Na_2S.9H_2O$ in 150 ml. of ethanol was heated under reflux for one hour. The solution was then diluted with water until slightly cloudy. On cooling, a solid precipitate formed. The mixture was diluted further with 100 ml. of water slowly with stirring. The precipitate was then filtered off, washed with 50% aqueous ethanol and dried. The yield of bis(2-hydroxy-3-t-butyl-5-methylbenzyl)sulfide was 68 g. (94%), M.P. 77–80° C.

*Analysis.*—Calculated: % C, 74.6; % H, 8.87; % S, 8.28. Found: % C, 74.84; % H, 8.66; % S, 8.09.

EXAMPLE 2

*Preparation of bis[2-hydroxy-3-(1,1,3,3-tetramethylbutyl)-5-methylbenzyl]sulfide*

The intermediate 2-hydroxy - 3-(1,1,3,3-tetramethylbutyl)-5-methylbenzyl 2-benzothiazolyl sulfide was prepared in the following manner:

A mixture of 1100 g. (5 moles) of 2-(1,1,3,3-tetramethylbutyl)-p-cresol, 162 g. (5 moles) of paraformaldehyde, 835 g. (5 moles) of 2-mercaptobenzothiazole, 10 g. of p-toluene-sulfonic acid and 1500 ml. of benzene was placed in a 5-liter, 3-neck flask equipped with stirrer, thermometer, Stark and Dean trap and condenser. The mixture was heated to reflux (80° C.) for six hours, during which time the water of reaction was azeotroped out and collected. A total of 90 ml. of water was collected (quantitative). The benzene was then distilled off, the last part in vacuo. The solid residue weighed 2,017 g. (quantitative) and was recrystallized from ethanol. The yield of recrystallized 2-hydroxy-3-(1,1,3,3-tetramethylbutyl)-5-methylbenzyl 2-benzothiazolyl sulfide was 1,660 g. (yield 83%), M.P. 101–103° C.

A solution of 16 g. (0.04 mole) of the 2-hydroxy-3-(1,1,3,3-tetramethylbutyl) - 5-methylbenzyl 2-benzothiazolyl sulfide and 4.8 g. (0.02 mole) of $Na_2S.9H_2O$ in 25 ml. of ethanol was heated on the steam bath for 30 minutes. The solution was poured into water and the product was extracted with hexane. The hexane solution was evaporated to an oil which was crystallized from methanol to yield 7 g. (70%) of bis[2-hydroxy-3-(1,1,3,3-tetramethylbutyl) - 5-methylbenzyl]sulfide, M.P. 92–93° C.

EXAMPLE 3

*Preparation of bis[2-hydroxy-3-(alpha,alpha-dimethylbenzyl)-5-methylbenzyl]sulfide*

The intermediate bis[2-hydroxy-3-(alpha,alpha-dimethylbenzyl)-5-methylbenzyl 2-benzothiazolyl sulfide was prepared in the following manner:

A mixture of 226 g. (1 mole) of 2-(alpha,alpha-dimethylbenzyl)-p-cresol, 33 g. (1.1 mole) of paraformaldehyde, 167 g. (1 mole) of 2-mercaptobenzothiazole, 2 g. of p-toluene-sulfonic acid and 250 ml. of benzene was placed in a one-liter, 3-neck flask and refluxed for four hours. The water of reaction (16 ml.) was azeotroped out as formed and collected in a Stark and Dean trap (theory=18 ml.). The benzene solution was washed with dilute aqueous sodium hydroxide to remove unreacted 2-mercaptobenzothiazole and was then concentrated down to a liquid residue which was crystallized from benzene. The yield of 2-hydroxy-3-(alpha,alpha-dimethylbenzyl)-5-methylbenzyl 2-benzothiazolyl sulfide and 101.5 g. (yield 33%), M.P. 141–143° C.

A solution of 81.2 g. (0.2 mole) of 2-hydroxy-3-(alpha,alpha-dimethylbenzyl) - 5-methylbenzyl benzothiazolyl sulfide and 24 g. (0.1 mole) of $Na_2S.9H_2O$ in 250 ml. of ethanol was heated on the steam bath for 1½ hours. The solution was cooled and the crystalline product was filtered off, washed with ethanol and dried. The yield of bis[2-hydroxy - 3-(alpha,alpha-dimethylbenzyl) - 5-methylbenzyl]sulfide was 40.5 g. (80%), M.P. 114–115° C.

The compounds made by the method of the present invention are useful as antioxidants for rubbers (e.g. natural rubber, butadiene-styrene copolymer rubbers, polybutadiene, polyisoprene, ethylene-propylene copolymer rubbers, ethylene-propylene-hexadiene copolymer rubbers and the like), and for the stabilization of other organic materials which normally tend to undergo oxidative deterioration in the presence of air, oxygen or ozone, such as fats, oils, greases, gasoline, etc.

In view of them any changes and modifications that may be made without departing from the principles underlying the invention, reference should be made to the appended claims for an understanding of the scope of the protection afforded the invention.

Having thus described my invention, what I claim and desire to protect by Letters Patent is:

1. A method of preparing a compound having the general formula

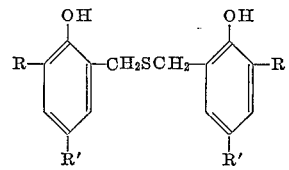

in which R and R' are selected from the group consisting of alkyl, cycloalkyl and aralkyl groups of up to 12 carbon atoms each, comprising treating two molar equivalents of a compound having the general formula

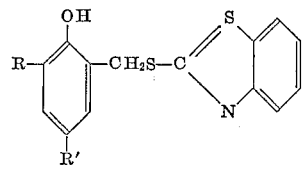

in which R and R' are as previously defined, with one to two molar equivalents of an alkali metal sulfide in a liquid medium comprising an organic solvent at a temperature from about 20° C. to about 100° C.

2. A method of preparing a compound having the general formula

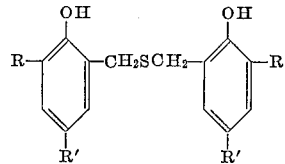

in which R and R' are selected from the group consisting of alkyl, cycloalkyl and aralkyl groups of up to 12 carbon atoms each, comprising treating two molar equivalents of a compound having the general formula

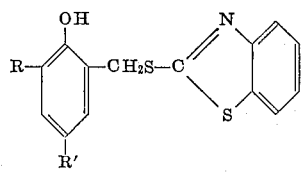

in which R and R' are as previously defined with one to two molar equivalents of an alkali metal sulfide at a temperature from about 20° C. to about 100° C.

3. A method of preparing a bis(2-hydroxy-3,5-dialkylbenzyl)sulfide in which the alkyl groups have up to 12 carbon atoms each which comprises treating two molar equivalents of 2-hydroxy-3,5-dialkylbenzyl 2-benzothiazolyl sulfide in which the alkyl groups have up to 12 carbon atoms each with one to two molar equivalents of an alkali metal sulfide at a temperature from about 20° C. to about 100° C.

No references cited.

CHARLES B. PARKER, *Primary Examiner.*

DELBERT R. PHILLIPS, *Assistant Examiner.*